(12) United States Patent
Gorobets

(10) Patent No.: US 9,032,134 B2
(45) Date of Patent: May 12, 2015

(54) METHODS OF OPERATING A MEMORY SYSTEM THAT INCLUDE OUTPUTTING A DATA PATTERN FROM A SECTOR ALLOCATION TABLE TO A HOST IF A LOGICAL SECTOR IS INDICATED AS BEING ERASED

(75) Inventor: Sergey Anatolievich Gorobets, Edinburgh (GB)

(73) Assignee: Micron Technology, Inc., Boise, ID (US)

( * ) Notice: Subject to any disclaimer, the term of this patent is extended or adjusted under 35 U.S.C. 154(b) by 170 days.

(21) Appl. No.: 13/417,715

(22) Filed: Mar. 12, 2012

(65) Prior Publication Data

US 2012/0173804 A1    Jul. 5, 2012

Related U.S. Application Data

(60) Division of application No. 13/073,496, filed on Mar. 28, 2011, now Pat. No. 8,135,925, which is a continuation of application No. 12/638,572, filed on Dec. 15, 2009, now Pat. No. 7,917,709, which is a continuation of application No. 10/256,891, filed on Sep. 27, 2002, now Pat. No. 7,634,624.

(30) Foreign Application Priority Data

Sep. 28, 2001    (GB) .................................. 0123410.3

(51) Int. Cl.
*G06F 12/00*    (2006.01)
*G06F 3/06*    (2006.01)

(52) U.S. Cl.
CPC .............. *G06F 3/0613* (2013.01); *G06F 3/064* (2013.01); *G06F 3/0679* (2013.01)

(58) Field of Classification Search
USPC ................... 711/154, 103, E12.008, 104, 105
See application file for complete search history.

(56) References Cited

U.S. PATENT DOCUMENTS

| | | | |
|---|---|---|---|
| 4,099,069 | A | 7/1978 | Cricchi et al. |
| 4,130,900 | A | 12/1978 | Watanabe |
| 4,210,959 | A | 7/1980 | Wozniak |

(Continued)

FOREIGN PATENT DOCUMENTS

| | | |
|---|---|---|
| AU | 0 557 723 | 1/1987 |
| EP | 0 220 718 A2 | 5/1987 |

(Continued)

OTHER PUBLICATIONS

Kai Hwang & Faye A. Briggs, *Computer Architecture and Parallel Processing*, McGraw-Hill Book Co., 1984, p. 64.

(Continued)

*Primary Examiner* — Mardochee Chery
(74) *Attorney, Agent, or Firm* — Dicke, Billig & Czaja, PLLC

(57) ABSTRACT

A method of operating a memory system includes receiving a read command from a host, where the read command is associated with a logical sector of a memory, determining whether the logical sector of the memory is indicated as being erased in a sector allocation table, if the logical sector of the memory is indicated as being erased, outputting a data pattern from the sector allocation table to the host, and if the logical sector of the memory is not indicated as being erased, reading a physical sector of the memory and outputting data from the physical sector of the memory to the host.

20 Claims, 5 Drawing Sheets

(56) References Cited

U.S. PATENT DOCUMENTS

| | | |
|---|---|---|
| 4,309,627 A | 1/1982 | Tabata |
| 4,355,376 A | 10/1982 | Gould |
| 4,398,248 A | 8/1983 | Hsia et al. |
| 4,405,952 A | 9/1983 | Slakmon |
| 4,414,627 A | 11/1983 | Nakamura |
| 4,450,559 A | 5/1984 | Bond et al. |
| 4,456,971 A | 6/1984 | Fukuda et al. |
| 4,468,730 A | 8/1984 | Dodd et al. |
| 4,473,878 A | 9/1984 | Zolnowsky et al. |
| 4,476,526 A | 10/1984 | Dodd |
| 4,498,146 A | 2/1985 | Martinez |
| 4,525,839 A | 6/1985 | Nozawa et al. |
| 4,532,590 A | 7/1985 | Wallach et al. |
| 4,609,833 A | 9/1986 | Guterman |
| 4,616,311 A | 10/1986 | Sato |
| 4,654,847 A | 3/1987 | Dutton |
| 4,710,871 A | 12/1987 | Belknap et al. |
| 4,746,998 A | 5/1988 | Robinson et al. |
| 4,748,320 A | 5/1988 | Yorimoto et al. |
| 4,757,474 A | 7/1988 | Fukushi et al. |
| 4,774,700 A | 9/1988 | Satoh et al. |
| 4,780,855 A | 10/1988 | Iida et al. |
| 4,788,665 A | 11/1988 | Fukuda et al. |
| 4,797,543 A | 1/1989 | Watanabe |
| 4,800,520 A | 1/1989 | Iijima |
| 4,829,169 A | 5/1989 | Watanabe |
| 4,843,224 A | 6/1989 | Ohta et al. |
| 4,845,662 A | 7/1989 | Tokumitsu |
| 4,896,262 A | 1/1990 | Wayama et al. |
| 4,914,529 A | 4/1990 | Bonke |
| 4,920,518 A | 4/1990 | Nakamura et al. |
| 4,924,331 A | 5/1990 | Robinson et al. |
| 4,943,745 A | 7/1990 | Watanabe et al. |
| 4,953,122 A | 8/1990 | Williams |
| 4,970,642 A | 11/1990 | Yamamura |
| 4,970,727 A | 11/1990 | Miyawaki et al. |
| 5,070,474 A | 12/1991 | Tuma et al. |
| 5,093,785 A | 3/1992 | Iijima |
| 5,168,465 A | 12/1992 | Harari |
| 5,198,380 A | 3/1993 | Harari |
| 5,200,959 A | 4/1993 | Gross et al. |
| 5,218,695 A | 6/1993 | Noveck et al. |
| 5,220,518 A | 6/1993 | Haq |
| 5,226,168 A | 7/1993 | Kobayashi et al. |
| 5,227,714 A | 7/1993 | Lou |
| 5,253,351 A | 10/1993 | Yamamoto et al. |
| 5,267,218 A | 11/1993 | Elbert |
| 5,268,318 A | 12/1993 | Harari |
| 5,268,870 A | 12/1993 | Harari |
| 5,270,979 A | 12/1993 | Harari et al. |
| 5,293,560 A | 3/1994 | Harari |
| 5,297,148 A | 3/1994 | Harari et al. |
| 5,303,198 A | 4/1994 | Adachi et al. |
| 5,305,276 A | 4/1994 | Uenoyama |
| 5,305,278 A | 4/1994 | Inoue |
| 5,315,541 A | 5/1994 | Harari et al. |
| 5,315,558 A | 5/1994 | Hag |
| 5,329,491 A | 7/1994 | Brown et al. |
| 5,337,275 A * | 8/1994 | Garner ............... 365/189.16 |
| 5,341,330 A | 8/1994 | Wells et al. |
| 5,341,339 A | 8/1994 | Wells |
| 5,341,341 A | 8/1994 | Fukuzo |
| 5,353,256 A | 10/1994 | Fandrich et al. |
| 5,357,475 A * | 10/1994 | Hasbun et al. ............ 711/103 |
| 5,359,569 A | 10/1994 | Fujita et al. |
| 5,365,127 A | 11/1994 | Manley |
| 5,369,615 A | 11/1994 | Harari et al. |
| 5,371,702 A | 12/1994 | Nakai et al. |
| 5,381,539 A | 1/1995 | Yanai et al. |
| 5,382,839 A | 1/1995 | Shinohara |
| 5,384,743 A | 1/1995 | Rouy |
| 5,388,083 A | 2/1995 | Assar et al. |
| 5,396,468 A | 3/1995 | Harari et al. |
| 5,404,485 A | 4/1995 | Ban |
| 5,406,527 A | 4/1995 | Honma |
| 5,418,752 A | 5/1995 | Harari et al. |
| 5,422,842 A | 6/1995 | Cernea et al. |
| 5,422,856 A | 6/1995 | Sasaki et al. |
| 5,428,621 A | 6/1995 | Mehrotra et al. |
| 5,430,682 A | 7/1995 | Ishikawa et al. |
| 5,430,859 A | 7/1995 | Norman et al. |
| 5,431,330 A | 7/1995 | Wieres |
| 5,434,825 A | 7/1995 | Harari |
| 5,438,573 A | 8/1995 | Mangan et al. |
| 5,465,235 A | 11/1995 | Miyamoto |
| 5,465,338 A | 11/1995 | Clay |
| 5,471,478 A | 11/1995 | Mangan et al. |
| 5,473,765 A | 12/1995 | Gibbons et al. |
| 5,479,638 A | 12/1995 | Assar et al. |
| 5,485,595 A | 1/1996 | Assar et al. |
| 5,490,117 A | 2/1996 | Oda et al. |
| 5,495,442 A | 2/1996 | Cernea et al. |
| 5,504,760 A | 4/1996 | Harari et al. |
| 5,508,971 A | 4/1996 | Cernea et al. |
| 5,513,138 A | 4/1996 | Manabe et al. |
| 5,515,333 A | 5/1996 | Fujita et al. |
| 5,519,847 A | 5/1996 | Fandrich et al. |
| 5,523,980 A | 6/1996 | Sakui et al. |
| 5,524,230 A | 6/1996 | Sakaue et al. |
| 5,530,673 A | 6/1996 | Tobita et al. |
| 5,530,828 A | 6/1996 | Kaki et al. |
| 5,530,938 A | 6/1996 | Akasaka et al. |
| 5,532,962 A | 7/1996 | Auclair et al. |
| 5,532,964 A | 7/1996 | Cernea et al. |
| 5,534,456 A | 7/1996 | Yuan et al. |
| 5,535,328 A | 7/1996 | Harari et al. |
| 5,541,551 A | 7/1996 | Brehner et al. |
| 5,544,118 A | 8/1996 | Harari |
| 5,544,356 A | 8/1996 | Robinson et al. |
| 5,552,698 A | 9/1996 | Tai et al. |
| 5,554,553 A | 9/1996 | Harari |
| 5,563,825 A | 10/1996 | Cernea et al. |
| 5,566,314 A | 10/1996 | DeMarco et al. |
| 5,568,439 A | 10/1996 | Harari |
| 5,572,466 A | 11/1996 | Sukegawa |
| 5,579,502 A | 11/1996 | Konishi et al. |
| 5,581,723 A | 12/1996 | Hasbun et al. |
| 5,583,812 A | 12/1996 | Harari |
| 5,592,415 A | 1/1997 | Kato et al. |
| 5,592,420 A | 1/1997 | Cernea et al. |
| 5,596,526 A | 1/1997 | Assar et al. |
| 5,598,370 A | 1/1997 | Niijima et al. |
| 5,600,316 A | 2/1997 | Moll |
| 5,602,987 A | 2/1997 | Harari et al. |
| 5,603,001 A | 2/1997 | Sukegawa et al. |
| 5,606,660 A | 2/1997 | Estakhri et al. |
| 5,611,067 A | 3/1997 | Okamoto et al. |
| 5,640,528 A | 6/1997 | Harney et al. |
| 5,642,312 A | 6/1997 | Harari |
| 5,648,929 A | 7/1997 | Miyamoto |
| 5,663,901 A | 9/1997 | Wallace et al. |
| 5,693,570 A | 12/1997 | Cernea et al. |
| 5,712,819 A | 1/1998 | Harari |
| 5,719,808 A | 2/1998 | Harari et al. |
| 5,723,990 A | 3/1998 | Roohparvar |
| 5,734,567 A | 3/1998 | Griffiths et al. |
| 5,745,418 A | 4/1998 | Ma et al. |
| 5,754,567 A | 5/1998 | Norman |
| 5,757,712 A | 5/1998 | Nagel et al. |
| 5,758,100 A | 5/1998 | Odisho |
| 5,761,117 A | 6/1998 | Uchino et al. |
| 5,768,190 A | 6/1998 | Tanaka et al. |
| 5,768,195 A | 6/1998 | Nakamura et al. |
| 5,773,901 A | 6/1998 | Kantner |
| 5,778,418 A | 7/1998 | Auclair et al. |
| 5,781,478 A | 7/1998 | Takeuchi et al. |
| 5,787,445 A | 7/1998 | Daberko |
| 5,787,484 A | 7/1998 | Norman |
| RE35,881 E | 8/1998 | Barrett et al. |
| 5,799,168 A | 8/1998 | Ban |
| 5,802,551 A | 9/1998 | Komatsu et al. |
| 5,809,515 A | 9/1998 | Kaki et al. |
| 5,809,558 A | 9/1998 | Matthews et al. |
| 5,809,560 A | 9/1998 | Schneider |

(56) References Cited

U.S. PATENT DOCUMENTS

| | | | |
|---|---|---|---|
| 5,818,350 A | 10/1998 | Estakhri et al. |
| 5,818,781 A | 10/1998 | Estakhri et al. |
| 5,822,245 A | 10/1998 | Gupta et al. |
| 5,822,252 A | 10/1998 | Lee et al. |
| 5,822,781 A | 10/1998 | Wells et al. |
| 5,831,929 A | 11/1998 | Manning |
| 5,835,935 A | 11/1998 | Estakhri et al. |
| 5,838,614 A | 11/1998 | Estakhri et al. |
| 5,845,313 A | 12/1998 | Estakhri et al. |
| 5,847,552 A | 12/1998 | Brown |
| 5,860,083 A | 1/1999 | Sukegawa |
| 5,860,124 A | 1/1999 | Matthews et al. |
| 5,862,099 A | 1/1999 | Gannage et al. |
| 5,890,192 A | 3/1999 | Lee et al. |
| 5,901,086 A | 5/1999 | Wang et al. |
| 5,907,856 A | 5/1999 | Estakhri et al. |
| 5,909,586 A | 6/1999 | Anderson |
| 5,920,884 A | 7/1999 | Jennings, III et al. |
| 5,924,113 A | 7/1999 | Estakhri et al. |
| 5,928,370 A | 7/1999 | Asnaashari |
| 5,930,815 A | 7/1999 | Estakhri et al. |
| 5,933,368 A | 8/1999 | Ma et al. |
| 5,933,846 A | 8/1999 | Endo |
| 5,936,971 A | 8/1999 | Harari et al. |
| 5,937,425 A | 8/1999 | Ban |
| 5,953,737 A | 9/1999 | Estakhri et al. |
| 5,956,473 A | 9/1999 | Ma et al. |
| 5,959,926 A | 9/1999 | Jones et al. |
| 5,966,727 A | 10/1999 | Nishino |
| 5,986,933 A | 11/1999 | Takeuchi et al. |
| 5,987,563 A | 11/1999 | Itoh et al. |
| 5,987,573 A | 11/1999 | Hiraka |
| 5,991,847 A | 11/1999 | Ballard et al. |
| 5,991,849 A | 11/1999 | Yamada et al. |
| 6,000,006 A | 12/1999 | Bruce et al. |
| 6,011,322 A | 1/2000 | Stumfall et al. |
| 6,011,323 A | 1/2000 | Camp |
| 6,018,265 A | 1/2000 | Keshtbod |
| 6,021,408 A | 2/2000 | Ledain et al. |
| 6,026,020 A | 2/2000 | Matsubara et al. |
| 6,026,027 A | 2/2000 | Terrell, II et al. |
| 6,034,897 A | 3/2000 | Estakhri et al. |
| 6,035,357 A | 3/2000 | Sakaki |
| 6,040,997 A | 3/2000 | Estakhri |
| 6,041,001 A | 3/2000 | Estakhri |
| 6,047,352 A | 4/2000 | Lakhani et al. |
| 6,055,184 A | 4/2000 | Acharya et al. |
| 6,055,188 A | 4/2000 | Takeuchi et al. |
| 6,069,827 A | 5/2000 | Sinclair |
| 6,072,796 A | 6/2000 | Christensen et al. |
| 6,076,137 A | 6/2000 | Asnaashari |
| 6,081,447 A | 6/2000 | Lofgren et al. |
| 6,081,878 A | 6/2000 | Estakhri et al. |
| 6,084,483 A | 7/2000 | Keshtbod |
| 6,097,666 A | 8/2000 | Sakui et al. |
| 6,115,785 A | 9/2000 | Estakhri et al. |
| 6,122,195 A | 9/2000 | Estakhri et al. |
| 6,125,424 A | 9/2000 | Komatsu et al. |
| 6,125,435 A | 9/2000 | Estakhri et al. |
| 6,128,695 A | 10/2000 | Estakhri et al. |
| 6,134,145 A | 10/2000 | Wong |
| 6,134,151 A | 10/2000 | Estakhri et al. |
| 6,141,249 A | 10/2000 | Estakhri et al. |
| 6,145,051 A | 11/2000 | Estakhri et al. |
| 6,151,247 A | 11/2000 | Estakhri et al. |
| 6,172,906 B1 | 1/2001 | Estakhri et al. |
| 6,173,362 B1 | 1/2001 | Yoda |
| 6,181,118 B1 | 1/2001 | Meehan et al. |
| 6,182,162 B1 | 1/2001 | Estakhri et al. |
| 6,202,138 B1 | 3/2001 | Estakhri et al. |
| 6,223,308 B1 | 4/2001 | Estakhri et al. |
| 6,226,708 B1 | 5/2001 | McGoldrick et al. |
| 6,230,234 B1 | 5/2001 | Estakhri et al. |
| 6,262,918 B1 | 7/2001 | Estakhri et al. |
| 6,272,610 B1 | 8/2001 | Katayama et al. |
| 6,275,436 B1 | 8/2001 | Tobita et al. |
| 6,279,069 B1 | 8/2001 | Robinson et al. |
| 6,279,114 B1 | 8/2001 | Toombs et al. |
| 6,285,607 B1 | 9/2001 | Sinclair |
| 6,327,639 B1 | 12/2001 | Asnaashari |
| 6,345,367 B1 | 2/2002 | Sinclair |
| 6,374,337 B1 | 4/2002 | Estakhri |
| 6,385,667 B1 | 5/2002 | Estakhri et al. |
| 6,393,513 B2 | 5/2002 | Estakhri et al. |
| 6,397,314 B1 | 5/2002 | Estakhri et al. |
| 6,411,546 B1 | 6/2002 | Estakhri et al. |
| 6,467,021 B1 | 10/2002 | Sinclair |
| 6,490,649 B2 | 12/2002 | Sinclair |
| 6,567,307 B1 | 5/2003 | Estakhri |
| 6,571,318 B1 | 5/2003 | Sander et al. |
| 6,578,127 B1 | 6/2003 | Sinclair |
| 6,587,382 B1 | 7/2003 | Estakhri et al. |
| 6,711,059 B2 | 3/2004 | Sinclair et al. |
| 6,721,819 B2 | 4/2004 | Estakhri et al. |
| 6,721,843 B1 | 4/2004 | Estakhri |
| 6,725,321 B1 * | 4/2004 | Sinclair et al. ............. 711/103 |
| 6,725,342 B1 | 4/2004 | Coulson |
| 6,728,851 B1 | 4/2004 | Estakhri et al. |
| 6,751,155 B2 | 6/2004 | Gorobets |
| 6,757,800 B1 | 6/2004 | Estakhri et al. |
| 6,813,678 B1 | 11/2004 | Sinclair et al. |
| 6,898,662 B2 | 5/2005 | Gorobets |
| 6,912,618 B2 | 6/2005 | Estakhri et al. |
| 6,950,918 B1 | 9/2005 | Estakhri |
| 6,957,295 B1 | 10/2005 | Estakhri |
| 6,973,519 B1 | 12/2005 | Estakhri et al. |
| 6,978,342 B1 | 12/2005 | Estakhri et al. |
| 7,000,064 B2 | 2/2006 | Payne et al. |
| 2003/0033471 A1 | 2/2003 | Lin et al. |

FOREIGN PATENT DOCUMENTS

| | | |
|---|---|---|
| EP | 0 243 503 A1 | 11/1987 |
| EP | 0 392 895 A2 | 10/1990 |
| EP | 0 424 191 A2 | 4/1991 |
| EP | 0 489 204 A1 | 6/1992 |
| EP | 0 522 780 A2 | 1/1993 |
| EP | 0 522 780 B1 | 1/1993 |
| EP | 0 544 252 A2 | 6/1993 |
| EP | 0 613 151 A2 | 8/1994 |
| EP | 0 617 363 A2 | 9/1994 |
| EP | 0 619 541 A2 | 10/1994 |
| EP | 0 663 636 A1 | 7/1995 |
| EP | 0 686 976 A2 | 12/1995 |
| EP | 0 897 579 B1 | 7/2000 |
| EP | 0 891 580 B1 | 11/2000 |
| EP | 0 896 669 BI | 11/2000 |
| EP | 0 852 766 B1 | 5/2001 |
| EP | 0 852 765 B1 | 9/2001 |
| EP | 0 722 585 B1 | 5/2002 |
| EP | 0 910 826 B1 | 6/2002 |
| EP | 0 691 008 B1 | 11/2002 |
| EP | 0 861 468 B1 | 4/2003 |
| EP | 0 978 040 B1 | 5/2004 |
| EP | 1 157 328 B1 | 5/2005 |
| FR | 93 01908 | 8/1993 |
| GB | 2 251 323 | 7/1992 |
| GB | 2 291 990 | 2/1996 |
| GB | 2 291 991 | 2/1996 |
| GB | 2 297 637 | 7/1996 |
| GB | 2 304 428 | 3/1997 |
| GB | 2 348 991 | 12/2002 |
| GB | 2 351 822 | 1/2003 |
| GB | 2 384 337 | 7/2003 |
| GB | 2 384 883 | 10/2005 |
| GB | 2 384 338 | 11/2005 |
| GB | 2 384 072 | 12/2005 |
| GB | 2 411 499 | 2/2006 |
| IS | 117881 | 5/2003 |
| JP | 59-45695 | 9/1982 |
| JP | 58-21594 | 12/1983 |
| JP | 58-21595 | 12/1983 |
| JP | 59-162695 | 9/1984 |
| JP | 60-212900 | 10/1985 |

(56) References Cited

FOREIGN PATENT DOCUMENTS

| | | |
|---|---|---|
| JP | 61-96598 | 5/1986 |
| JP | 62-283496 | 12/1987 |
| JP | 62-283497 | 12/1987 |
| JP | 63-183700 | 7/1988 |
| JP | 1-138694 | 5/1989 |
| JP | 3-228377 | 10/1991 |
| JP | 4-57295 | 2/1992 |
| JP | 4-254994 | 9/1992 |
| JP | 4-268284 | 9/1992 |
| JP | 4-278297 | 10/1992 |
| JP | 4-332999 | 11/1992 |
| JP | 5-128877 | 5/1993 |
| JP | 5-282883 | 10/1993 |
| JP | 6-36578 | 2/1994 |
| JP | 6-124175 | 5/1994 |
| JP | 6-124231 | 5/1994 |
| JP | 6-132747 | 5/1994 |
| JP | 6-149395 | 5/1994 |
| JP | 6-131889 | 6/1994 |
| JP | 6-266596 | 9/1994 |
| JP | 7-93499 | 4/1995 |
| JP | 7-311708 | 11/1995 |
| JP | 8-18018 | 1/1996 |
| JP | 8-69696 | 3/1996 |
| JP | 9-147581 | 6/1997 |
| SU | 1388877 | 4/1988 |
| SU | 1408439 | 7/1988 |
| SU | 1515164 | 10/1989 |
| SU | 1541619 | 2/1990 |
| SU | 1573458 | 6/1990 |
| SU | 1686449 | 10/1991 |
| WO | WO 84/00628 | 2/1984 |
| WO | WO 94/20906 | 9/1994 |

OTHER PUBLICATIONS

Walter Lahti and Dean McCarron, "State of the Art: Magnetic VS Optical Store Data in a Flash", *Byte Magazine*, Nov. 1, 1990. 311, vol. 15, No. 12.

Ron Wilson, Technology Updates, Integrated Circuits, "I-Mbit flash memories seek their role in system design", *Computer Design* 28 (1989) Mar. 1, No. 5, Tulsa OK, US, pp. 30 and 32.

Mendel Rosenblum and John K. Ousterhout, "The Design and Implementation of a Log-Structured File System," 1991, 15 pgs., Berkeley, USA.

Brian Dipert and Markus Levy, *Designing with Flash Memory*, Annabooks, Apr. 1994, 445 pgs.

Science Forum, Inc. "Flash Memory Symposium '95", 1995, 13 pgs. Tokyo.

Ross S. Finlayson and David R. Cheriton, "An Extended File Service Exploiting Write-Once Storage," *ACM Symposium on Operating Systems Principles*, 1987, 10 pgs.

Jason Gait, "The Optical File Cabinet: A Random-Access File System for Write-Once Storage", *Computer*, Jun. 1988, 12 pgs.

Henry G. Baker, *Memory Management*, 1995, Springer-Verlag Heidelberg, Germany, 19 pgs.

Sape J. Mullender and Andrew S. Tanenbaum, "A Distributed File Service Based on Optimistic Concurrency Control", *ACM Press*, 1985, 12 pgs. New York, New York.

Hiroshi Nakamura, Junichi Miyamoto, Kenichi Imamiya and Yoshihisa Iwata, "A Novel Sense Amplifier for Flexible Voltage Operation NAND Flash Memories", VLSI Circuits, 1995, *Digest of Technical Papers*, 2 pgs.

Hiroshi Nakamura, Junichi Miyamoto, Kenichi Imamiya, Yoshihisa Iwata and Hideko Oodaira, "A Novel Sensing Scheme with On-Chip Page Copy for Flexible Voltage NAND Flash Memories", *IEICE Transactions on Electronics*, vol. E79-C, No. 6, pp. 836-844.

Takaaki Nozaki, Toshiaki Tanaka, Yoshiro Kijiya, Eita Kinoshita, Tatsuo Tsuchiya and Yutaka Hayashi, "A 1-Mb EEPROM with MONOS Memory Cell for Semiconductor Disk Application", *Journal of Solid-State Circuits*, vol. 26, No. 4, 5 pgs.

S. Mehroura, J.H. Yuan, R.A. Cemea, W.Y. Chien, D.C. Guteman, G. Samachisa, R.D. Norman, M. Mofidi, W. Lee, Y. Fong, A. Mihnea, E. Hann, R.W. Gregor, E.P. Eberhardt, J.R. Radosevich, K.R. Stiles, R.A. Kohler, C.W. Leung, and T.J. Mulrooney, "Serial 9Mb F EEPROM for Solid State Disk Applications", symposium, 2 pgs., 1992, Mountain View, CA.

Steven H. Leibson, "Nonvolatile, In-Circuit-Reprogrammable Memories", *EDN Special Report*, Jan. 3, 1991, No. 12, 12 pgs.

Walter Lahti and Dean McCarron, "State of the Art: Magnetic vs. Optical Store Data in a Flash", *Byte Magazine*, 1990, vol. 15, No. 12, 7 pgs.

Ramon Caceres, Fred Douglis, Kai Li and Brian Marsh, "Operating System Implications of Solid-State Mobile Computers", *Workshop on Workstation Operating Systems*, Oct. 1993, pp. 21-27.

Michael Wu and Wily Zwaenepoel, "A Non-Volatile, Main Memory Storage System", *ACM Press*, 1994, 12 pgs., San Jose, CA.

Dave Bursky, "Innovative flash memories match DRAM densities: available with a choice of features, flash memories are finding homes in many systems (including related articles on the origins of flash, and on the differences between NAND and NOR flash memories)", *Electronic Design*, May 16, 1994, vol. 42, No. 10, 9 pgs.

Anthony Cataldo, "New flash enhancements up ante. (Intel's 28F400BV-120 and 28F004BV-120, Atmel's AT29BV010 and AT29BV020, and Samsung Semiconductor's KM29V3200 flash memory devices)" (product announcement), *Electronic News*, Mar. 13, 1995, vol. 41, No. 2056, 4 pgs.

Sam Weber, "Flash modules' portability, reusability, small size valued for a host of APPs-Consumer formats flocking to flash", *Electronic Engineering Times*, Jul. 22, 1996, No. 911, 9 pgs.

Stan Baker, "But Integration Calls for Hardware, Software Changes: Flash designers face the dawn of a new memory age", *Electronic Engineering Times*, Dec. 3, 1990, vol. 41, No. 619, 5 pgs.

Toshiba, MOS Memory (Non-Volatile), 1995, Data Book.

Toshiba, Toshiba MOS Digital Integrated Circuit Silicon Gate CMOS, (TC58NS512DC), Mar. 21, 2001, 43 pgs., Data Book.

Toshiba, Toshiba Corporation, SMIL (Smartmedia Interface Library) Hardware Edition Version 1.00, Jul. 1, 2000, 136 pgs., Data Book.

Toshiba, Toshiba MOS Digital Integrated Circuit Silicon Gate, (TC58512FT), Mar. 5, 2001, 43 pgs., Data Book.

Toshiba, Toshiba MOS Digital Integrated Circuit Silicon Gate, (TC58DVM92A1FT00), Jan. 10, 2003, 44 pgs., Data Book.

Toshiba, Toshiba MOS Digital Integrated Circuit Silicon Gate, (TC58DVG02A1FT00), Jan. 10, 2003, 44 pgs., Data Book.

Toshiba, Toshiba MOS Digital Integrated Circuit Silicon Gate, (TC58100FT), Mar. 5, 2001, 43 pgs., Data Book.

Toshiba, MOS Memory (Non-Volatile), 1996, 279 pgs., Data Book.

"Fifth Biennial Nonvolatile Memory Technology Review," 1993 Conference, Jun. 22-24, 1993, Linthicum Heights, MD, USA.

Dan Auclair, "Optimal Solid State Disk Architecture for Portable Computers", Silicon Valley PC Design Conference, Jul. 9-10, 1991, pp. 811-815.

* cited by examiner

METHODS OF OPERATING A MEMORY SYSTEM THAT INCLUDE OUTPUTTING A DATA PATTERN FROM A SECTOR ALLOCATION TABLE TO A HOST IF A LOGICAL SECTOR IS INDICATED AS BEING ERASED

RELATED APPLICATIONS

This application is a Divisional of U.S. application Ser. No. 13/073,496, titled "METHODS OF OPERATING A MEMORY SYSTEM," filed Mar. 28, 2011, now U.S. Pat. No. 8,135,925 issued Mar. 13, 2012, which is a Continuation of U.S. application Ser. No. 12/638,572, titled "MEMORY SYSTEM FOR DATA STORAGE AND RETRIEVAL," filed Dec. 15, 2009, now U.S. Pat. No. 7,917,709 issued Mar. 29, 2011, which is a Continuation of U.S. application Ser. No. 10/256,891, titled "MEMORY SYSTEM FOR DATA STORAGE AND RETRIEVAL," filed Sep. 27, 2002 now U.S. Pat. No. 7,634,624 issued Dec. 15, 2009, which claims the benefit of the priority date of British Application No. 0123410.3, entitled "MEMORY SYSTEM FOR DATA STORAGE AND RETRIEVAL," filed on Sep. 28, 2001, each of which is incorporated by reference in their entirety.

TECHNICAL FIELD

The present invention relates generally to a solid state memory system for a data storage and retrieval having a memory controller for controlling access to a non-volatile memory of the solid state memory system and particularly to a method and apparatus for accessing data stored within the non-volatile memory of the solid state memory system at an increased speed when the data has a repetitive pattern.

BACKGROUND

It is known to use solid state memory systems to try to emulate magnetic disk storage devices in computer systems. In particular, it is an aim of the industry to try to increase the speed of operation of solid state memory systems to better emulate magnetic disc storage.

A typical memory system comprises a non-volatile memory, such as a Flash memory, and a controller. The flash memory has individually addressable sectors wherein a memory sector is a group of flash memory locations which is allocated for storage of one Logical Sector. A memory sector need not be a physical partition within Flash memory, nor need it be contiguous Flash memory locations, so the memory sector address may be a virtual address conveniently used by the controller. The controller writes data structures to and reads data structures from the memory, and translates logical addresses received from the host to physical, or virtual addresses, of the memory sectors in the memory.

When a logical sector write command is received from the host, the controller translates a logical address received from the host and allocates a memory sector for the logical sector to be written to. The controller is also responsible for maintaining a table of logical addresses with respective physical addresses which have been allocated by the controller. The table is referred to as the Sector Allocation Table or SAT. There is also, in some cases, a system or hierarchy of SATs to provide improved ease of access and to reduce the update frequency required.

The physical or virtual, sector addresses in the SAT are typically ordered by logical sector address, where the Nth SAT entry includes the physical address of a sector to which data having logical address N has been written. When a sector read command is received from the host, the controller looks up a logical sector address received from the host in the SAT in order to obtain the physical sector address which the controller previously allocated to the logical sector. On some occasions one SAT entry is used to define the address of a group of contiguous memory sectors containing a group of contiguous logical sectors.

A feature of the flash memory is that the flash memory must be pre-erased before the data can be written. This means that, in general, in the flash memory system, when a logical sector is written, the obsolete copy of the logical sector should be erased before or after. Here, the term erased memory sector will be used for a memory sector which has all the cells erased. Quite often the memory sectors are not individually erasable, but, grouped to be erasable in units or blocks. The controller can use various methods to maintain the flash memory. Any memory sector which has been written to will be treated by the controller as a memory sector which has not been erased.

The host can issue a sector erase command to erase the logical sector in the memory in order to delete all the sector data and pre-erase the card for a faster sector write operation in the future. This results in the sector write operation consisting of Flash memory writes only and no erases. The term erased logical sector is generally used not only for a logical sector which has been erased, but, also for a sector which has not yet been written. Due to the complexity of flash memory organization and complexity of its maintenance, various algorithms can be used which allows an erased logical sector to be temporarily marked in the SAT as obsolete, but, the memory sector containing the logical sector can be erased later. The example of such a memory system is illustrated in the "Memory System" detailed in patent application WO 00/49488 PCT/GB00,00550). FIG. 1 (prior art) illustrates the address translation algorithm of the Memory System of WO 00/49488. FIG. 2 illustrates the sector read operation of the Memory System of WO 00/49488. WO 00/49488 describes the technique of using the SAT Table not only to define physical locations of the written logical sectors, but, also to mark them as deleted or bad. In the case of the deleted or never written sector the corresponding SAT entry includes the virtual address value showing that the sector includes no data the controller sets all the bytes of the sector data buffer to all 1s and the sector then will be output to the host.

Thus, a need arises to obviate or mitigate at least one of the aforementioned problems.

DETAILED DESCRIPTION

Figure 3:
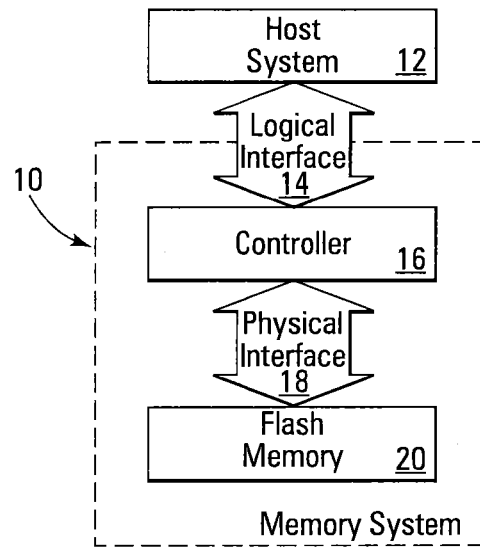
FIG. 3 shows a flash memory system in accordance with an embodiment of the present invention.

With reference to FIG. 3, there is shown a flash memory system 10 in which a method of achieving faster access of the data in the memory system is adopted. The memory system 10 comprises a controller 16 and flash memory 20 which are connected by physical interface 18. The memory system 10 is connected to an associated host system 12 by logical interface 14. The logical interface 14 connects to the controller 16 of the memory system 10 and reads from, and writes data to the host system 12 in logical sectors of 512 bytes of data. Each logical sector is identified by a logical address which in this case is a sequential logical block address (LBA) and may be accessed randomly for either reading or writing data. Data is written to and read from the flash memory 20 in physical sectors each of which typically has sufficient capacity for 512 bytes of data from the host system, plus 16 bytes of overhead data appended by the controller 16. Each physical sector is identified by a physical sector address which normally has separate components identifying the flash chip within the memory subsystem, the flash block within the flash chip and the physical sector within the flash block. Data may only be written to a physical sector if the sector has previously been erased, and erasure takes place in response to a command at the physical interface 18 in units of a flash block which typically includes 32 physical sectors. Physical sectors may be randomly accessed for reading data. In the present arrangement, wherein the memory comprises NAND Flash chips, a physical sector is equivalent to a physical page within the flash array and has a capacity of 528 bytes. In this case, each flash chip is considered to comprise four arrays, each of which can be programmed with one sector at any time.

The controller 16 provides a method of detecting the pattern of the logical sector data which is due to be written to the flash memory 20 when a sector write command is issued by the host 12. If the sector data has a flat repetitive pattern, for example, if all the bytes of the sector data are the same, then the controller 16 may use the corresponding sector address table (SAT) entry to record the pattern, which in this case is a content of any one byte of sector data, and mark the logical sector as being erased. It is therefore, not necessary to write the sector data to the flash memory 20 in order to record the sector data, instead it is enough to keep the information about the sector pattern in the SAT. The obsolete copy of the sector data must then be erased in flash memory, as is the case when any new sector data is written to the flash memory system. However, in this case, the new valid sector data is stored in a SAT entry instead of in a memory sector in flash memory.

When it is desired that the sector data be read, a logical sector read command is sent by the host 12 and the controller 16 looks up the SAT and checks the virtual address value provided by the SAT shows that the sector data is deleted, the controller 16 takes the sector data pattern value from the entry within the SAT to output the sector data as if it was being retrieved from the flash memory 20.

This operation results in the speed of the access to the flash data by the host 12 being greatly improved as the sector write operation no longer comprises the step of sector data write to the flash memory 20 and the sector read operation does not comprise the step of sector data read from the flash memory 20.

Some hosts may write a large number of flat data sectors which can be a part of large uncompressed data base files. It is also the case that the host 12 can deliberately 'precondition' or format the memory system by writing all 0's or 1's in order to delete all the information (which is a standard security feature). The ATA standard Format Track command can also be treated as the flat sector write command.

Figure 4A:
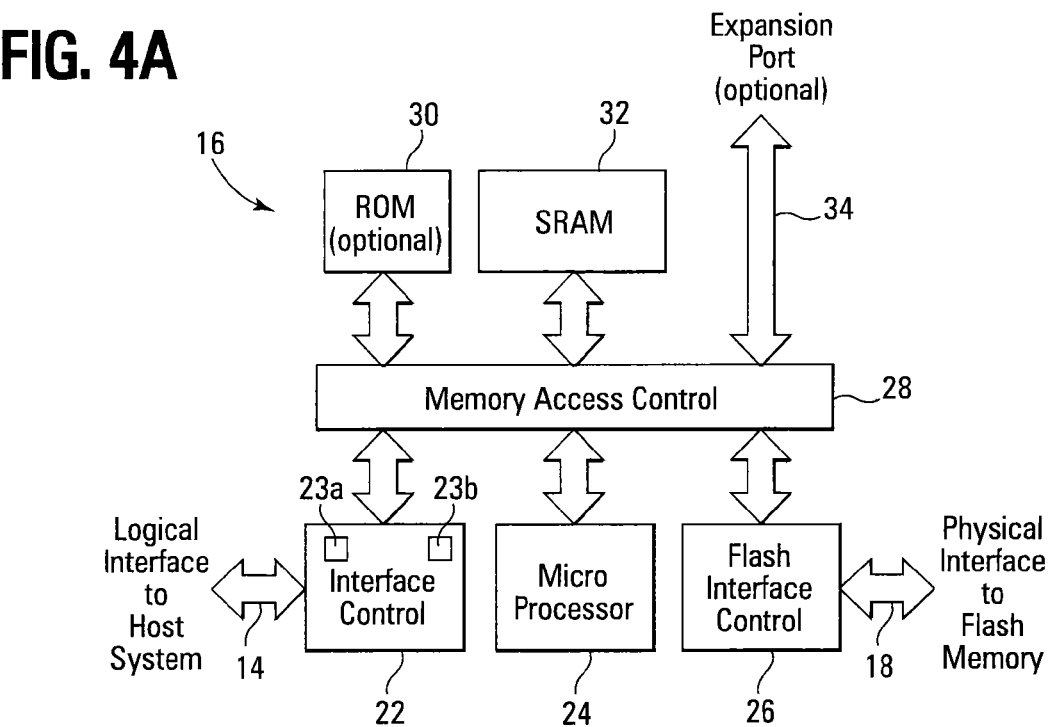
FIG. 4a shows a first embodiment of the hardware architecture of the controller of the flash memory of FIG. 3.
Figure 4B:
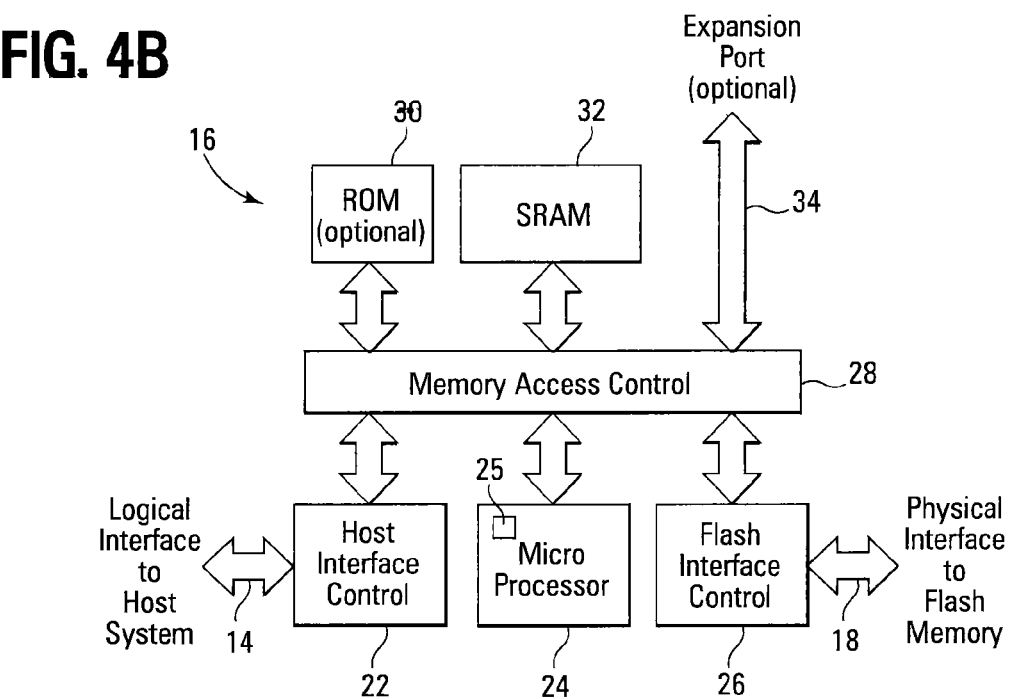
FIG. 4b shows a second embodiment of the hardware architecture of the controller of the flash memory of FIG. 3.

With reference to FIGS. 4a and 4b there is shown the hardware architecture of the controller 16 of flash memory system 10. The controller comprises memory access control, or system bus 28, host interface control block 22 to which logical interface 14 connects, microprocessor 24, flash interface control block 26 to which physical interface 18 connects, Read Only Memory (ROM) 30, and synchronous random access memory (SRAM) 32.

The host interface control block 22 provides the path to the controller 16 for data flow to and from host system 12.

With reference to FIG. 4a there is shown a first embodiment of the hardware architecture of controller 16 in which the host interface control block 22 has, embedded within itself, a pattern detection circuit 23a which compares all the data portions of incoming data when the host 12 issues a sector write command and sends sector data to the memory system 10. The pattern detection circuit 23a then indicates to the microprocessor whether the incoming data has a flat pattern. The pattern detection circuit 23a compares all the sector data portions (1, 2 or 4 bytes) with each other. This can be done, for example, by fetching the first data portion and XOR-ing it with all other data portions, at least one non-zero result triggers signaling of a non-flat pattern. Flat pattern can also be detected by XOR-ing every incoming data portion with the previous one. The pattern value of the incoming data then can be obtained by the microprocessor 24 from the pattern detection circuit 23a or by reading any data portion from the sector buffer SRAM 32.

The host interface 22 has pattern output circuit 23b which can be programmed by the microprocessor 24 to output a certain pattern to the host 22 when the sector read command is received from the host, instead of transferring the sector data from the sector buffer SRAM 32. The pattern value is obtained by the microprocessor 24 from the corresponding SAT entry when the sector is marked there as erased.

With reference to FIG. 4b there is shown a second embodiment of the hardware architecture of controller 16 in which firmware 25 of the microprocessor 24 provides a pattern detection facility which can compare all the data portions of the sector data by reading the sector buffer in SRAM 32. Firmware 25 is instruction code for the microprocessor and is normally stored in one of the memories (ROM, SRAM or Flash memory).

In this arrangement the pattern output can also be provided by the firmware of microprocessor 24 which can simply fill up all the data portions in the sector buffer in SRAM 32 by the pattern values.

Figure 5:
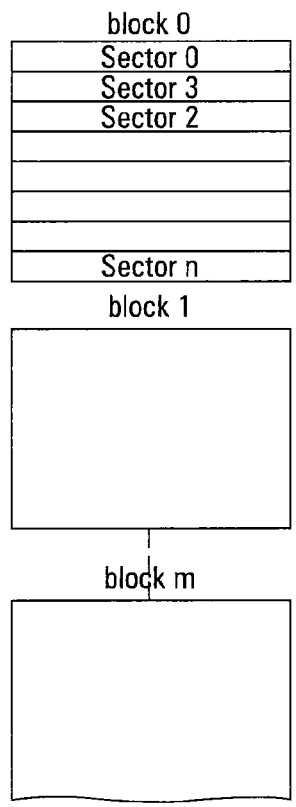
FIG. 5 shows a graphical representation of the virtual blocks into which the flash memory of the flash memory system is organized.

With reference to FIG. 5 the flash memory 20 is organized into virtual blocks each of which includes a number of virtual pages. Each virtual page is of the size of a memory sector (such as "sector 2") which in this case is 528 bytes. Every logical sector, including control over head, is stored in a memory sector, including control overhead, is stored in a memory sector the location of which is defined by the virtual block address and the virtual page address within the virtual block. The memory sector and virtual page need not be a physical partition within Flash memory 20, nor contiguous Flash memory locations, so that the memory sector address may be a virtual address conveniently used by the controller 16.

In the first embodiment of this arrangement the SAT is a table of 3-byte entries, and each entry is called a SAT Entry. Sat Entry i includes the virtual address of the sector with logical address i.

In a second embodiment the SAT has a different structure which is, for example, divided into smaller blocks hierarchically organized in order to provide faster SAT update.

Temporary copies of SAR blocks used as a cache may also have the same entry format as either of the above SAT structure arrangements.

Each SAT Entry virtual address, as with all virtual addresses, comprises two components the first of which is a virtual block number and the second of which is a memory sector offset within the virtual block. The virtual block number comprises all except the least significant byte of the three byte entries. The least significant byte includes the memory sector offset. By restricting to relatively small blocks having a size of not more than 128 memory sectors the maximum sector offset only requires the least significant 7 bits of the Byte.

In a SAT entry, some illegal addresses may be entered to represent special cases. Four such cases are illustrated in Table 1.

TABLE 1

| Case Number | Virtual Block Address Field | Memory Sector Offset Illegal Bit | Memory Sector Offset Legal Bits | Description |
| --- | --- | --- | --- | --- |
| 1 | 0 | Constant Pattern Data | | Constant Data Sector (including Erased Sector) |
| 2 | 1 | X (don't care) | | Bad Sector |
| 3 | B > 1 | 0 | S | Valid Written Sector |
| 4 | B > 1 | 1 | S | Sector Marked as Erased |

In cases 1 and 2, that is the cases in which the sector is a constant data sector (including erased sector) or a bad sector, the virtual block address correspond to reserved locations. This means virtual block addresses 0 and 1 belong to special control blocks used by the controller and can therefore never map onto valid data sectors. The values 0-1 may thus be used to indicate these special cases.

In case 1 the sector includes constant data, so that the whole of the sector offset byte including the illegal bit includes the pattern data which is repeated through the sector. This technique is also used for erased sectors—wherein the constant data pattern is set to all 1s.

In case 2 the sector is marked as bad, and therefore any values in the sector offset byte are immaterial and therefore the sector is set as X=don't care. In this case when the host accesses the sector marked as bad, no operation is performed and error status is returned to the host.

Case 3 represents the valid written sector address recorded in the SAT entry and in this case the virtual block address field word B is set as being greater than 1 and therefore a valid data block number.

In case 4, the extra illegal sector offset-bit in the sector has been erased, but the actual memory sector may not yet have been erased physically. The virtual address of the memory sector is obtained from the entry by setting the extra illegal sector offset bit to zero. This means the word B is a valid data block number, and the legal sector offset bits S yield a valid sector offset. The obsolete copy of such a sector is due to the physically erased and data pattern is due to be set to all 1s. This technique can be used to postpone the physical erase operation in order to do it more efficiently by erasing a large group of memory sectors at a time.

The implementation of the write sector command, normally by the controller microprocessor firmware may be implemented in many ways examples of which will now be given. Each of the detailed examples is for multiple sector commands when the host sends a group of sectors by one command.

In a first embodiment of the implementation of the write sector command the SAT is updated immediately after a repetitive data sector is detected. In this case the logical sector is not written to the flash memory 20, instead the logical sector pattern is recorded in the corresponding SAT entry. The immediate up date of the SAT or, as mentioned, a temporary SAT copy is essential to ensure the contents of the sector are not lost if the command is terminated and power is turned off.

Typically upon implementation of the write sector command the controller 16 checks the pattern of a series of the incoming sectors. The series may include all the logical sectors to be written by the write command or a limited number of sectors written in response to the command (in order to simplify the algorithm). In this case, the series is limited either by the sector count of the write command or until the write-pointer, or W-pointer, reaches end of the block whichever is shorter. The service can also be cancelled when the write-pointer reaches the end of the virtual block as well as when the actual memory write is postponed as detailed in the second and third embodiments respectively. This means that sectors belonging to the same write command can be split to several group. The benefit of this is that it significantly reduces the number of SAT updates and therefore improves performance.

The controller 16 may additionally incorporate a media management operation which is implemented by algorithms which embody the principle that data is written at physical sector locations in Flash memory 20 which follow the same order as the sequence in which the data is written. This is achieved by writing each logical data sector at a physical sector location defined by a cyclic write pointer.

Figure 6:
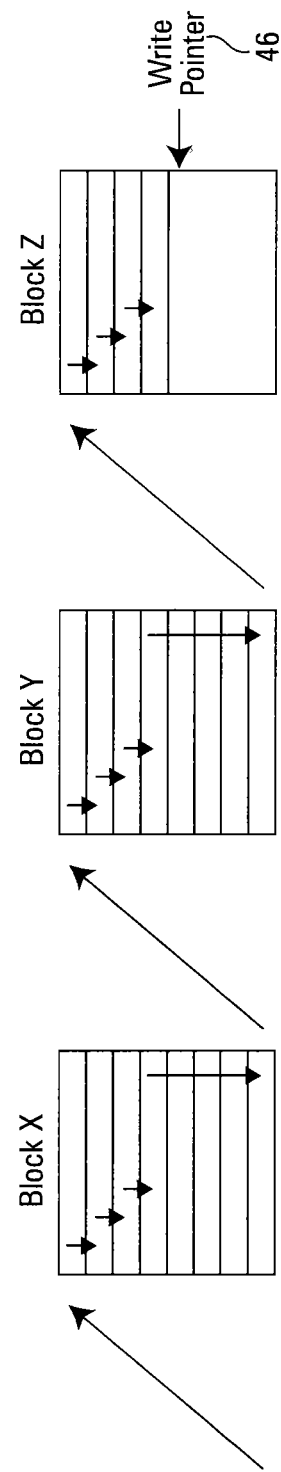
FIG. 6 shows a schematic representation of the data write operation used in FIG. 5.

A schematic representation of such a write operation is shown in FIG. 6. The data write pointer 46 moves sequentially through the memory sector positions of a virtual block in Flash memory, and therefore through a chain of blocks, such as block X, block Y and block Z from which the virtual block is formed, in a manner defined by a block sequencing algorithm. Each of block S, block Y, and block Z is a physical structure in flash memory 20 which, in this case comprises sixteen sector locations which can be erased a single operation.

In a second embodiment of the implementation of the write sector command the controller 16 checks the pattern of a series of the incoming sectors without writing them to the flash memory 20 if the data of the sectors is same, i.e. the data pattern is flat. If all the sectors of the series are of the same flat pattern then the SAT is updated. The case when all the sectors have repetitive data, but, are different from each other can be handled similarly until the SAT is updated, the record of the sectors' pattern being kept in the controller's volatile memory that is the SRAM 32. If a non-flat sector is detected then the series is terminated and a group of previously received flat sectors is written to the flash memory in the original order prior to the last received, first non-flat, write. Although those sectors may no longer exist in the sector buffer they can be recreated by the controller 16 which has information about their data pattern. Having done that, there is no need to mark those sectors as erased in the SAT and the SAT will be updated with their virtual memory addresses as in the prior art system. An alternative process is marking all the flat sectors as erased in SAT without writing them to flash 20. In this case not all the logical sectors written by the same command will be written or erased so they will be handled differently in future write and read commands. However, normally the sectors sent by the same command belong to the same file and it is preferable therefore to handle them all in uniform manner to simplify the operation and improve performance.

In a third embodiment of the implementation of the write sector command the controller 16 checks the pattern of a series of the informing sectors and writes them to flash 20 in the normal way.

When all the sectors of the series are of the same flat pattern then the sectors are erased and the SAT is updated by their patterns. The case when all the sectors have repetitive data, but different from each other is handled similarly. This method is slow as the sectors are written and then erased, but, is more reliable as the latest copies of the sectors would not be lost if the write command is terminated and the power is turned off.

Figure 1:
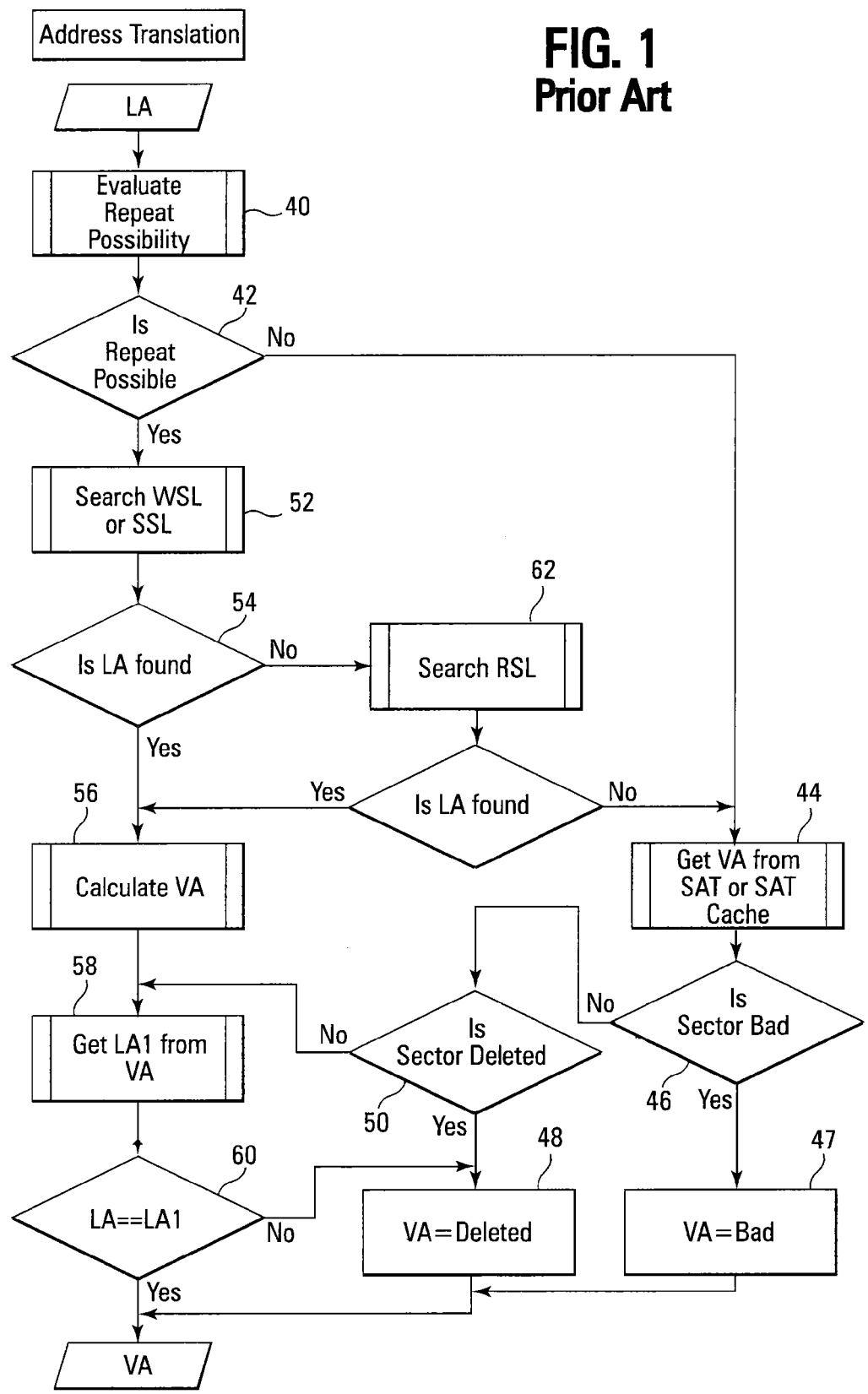
FIG. 1 shows an address translation algorithm of a prior art memory system.
Figure 2:
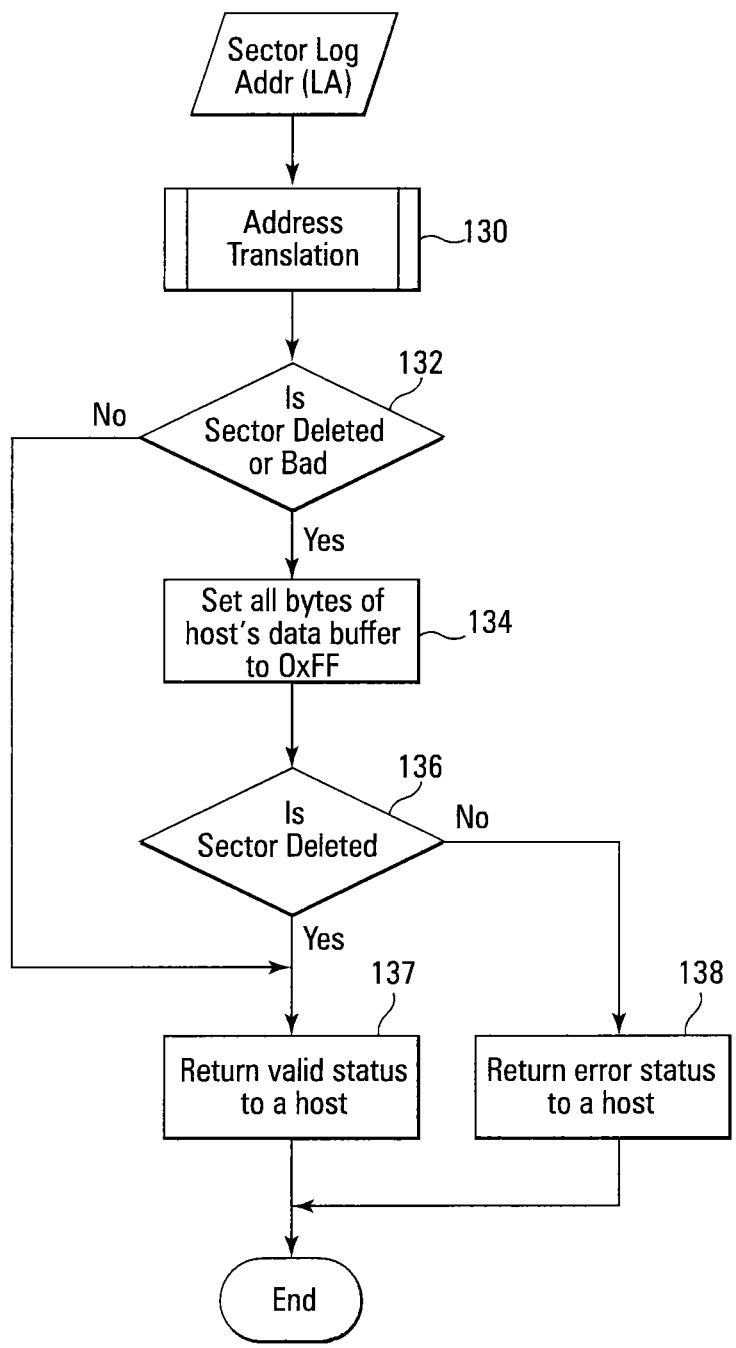
FIG. 2 shows a sector read operation of a prior art memory system.

In each of the above embodiments of the implementation of the write sector command the obsolete copies of the sectors rewritten or erased by the write command should be marked obsolete in a Current Obsolete Block list (COB) which is maintained by the controller for subsequent bulk erasure and erased upon the issuing of an erase sector command sent from the host 12. The erasure process is performed as a foreground operation during the sector write process. At the end of the write command the SAT must be updated in flash 20 to record the latest change of the sectors erased or marked as erased, as well as this the control data structures in flash should be updated to record the latest COB. Recording the latest COB is particularly important, as upon erasing a sector the controller has no record of whether the latest existing copy of the sector was written before or after the sector was erased. The updated COB will therefore contain the correct information about obsolete sector copies. In the context of the system being described, the read operation is implemented similarly to that shown in FIG. 2 (prior art) which illustrates by the read operation of the "Memory System", detailed in patent application WO 00/49488.

If the sector to be read from the flash memory 20 is found to marked as erased in the SAT then the controller 16 programs the pattern output circuit 23*b* located in host interface control 22 (FIG. 4*a*) by the repetitive sector pattern. The host then receives the original sector data generated by the pattern output circuit 23*b* instead of being read from flash 20.

When the erase sector command is issued by the host the sectors are marked as erased in the SAT with the default pattern. The obsolete copies of the sectors, if there are any not erased previously, must also be erased.

As the erasure of flash memory 20 is often a relatively long operation the controller 16 uses a technique of marking the sectors as erased in SAT without physically erasing them, as described above in case 3 of the SAT entry format. Having collected a group of such sectors the controller 20 is then able to erase many memory sectors at once by a single flash erase operation. This ability to perform block erasure is defined by flash memory architecture.

Various modifications may be made, for example, the ROM and the expansion port included in the controller of FIGS. 4*a* and 4*b* are optional components only. The logical address identifying each sector has been described as a sequential Logical Block Address, however, an address in the Cylinder/Head/Sector (CHS) format originally used with magnetic disk devices may be used. It should also be noted that pages within the flash array have been described as being equivalent to a sector; however, in some AND flash memory chips a page may comprise four sectors and have a capacity of 211 bytes.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of operating a memory system, comprising:
receiving a read command from a host, wherein the read command is associated with a logical sector of a memory;
determining whether the logical sector of the memory is indicated as being erased in a sector allocation table; and
when the logical sector of the memory is indicated as being erased, generating a sector of data from a data pattern in the sector allocation table and outputting the generated sector of data to the host;
wherein the generated sector of data is an original sector of data intended to be written to the logical sector of the memory in response to a write command and the data pattern is a portion of the original sector of data.

2. The method of claim 1, wherein outputting the generated sector of data to the host when the logical sector of the memory is indicated as being erased comprises outputting the generated sector of data regardless of whether a physical sector of the memory corresponding to the logical sector of the memory is actually erased.

3. The method of claim 1, wherein outputting the generated sector of data to the host comprises outputting the generated sector of data from a pattern output circuit, wherein the generated sector of data is generated from the data pattern using the pattern output circuit.

4. The method of claim 1, wherein the data pattern comprises a data pattern of 1, 2 or 4 bytes.

5. The method of claim 4, wherein the generated sector of data is generated from the data pattern by repeating the data pattern of 1, 2 or 4 bytes for the generated sector of data.

6. The method of claim 1, wherein determining whether the logical sector of the memory is indicated as being erased in a sector allocation table comprises determining whether the logical sector of the memory is indicated as having an invalid mapping to a particular reserved location of the memory and determining that a memory sector offset component of the sector allocation table contains all 1s.

7. The method of claim 1, wherein determining whether the logical sector of the memory is indicated as being erased in a sector allocation table comprises determining whether the logical sector of the memory is indicated as having a mapping to a valid data block of the memory and determining that a particular bit of a memory sector offset component of the sector allocation table has a particular value.

8. A method of operating a memory system, comprising:
receiving a read command from a host, wherein the read command is associated with a logical sector of a memory;
determining whether the logical sector of the memory is indicated as being erased, or having an invalid mapping to a reserved location of the memory, in a sector allocation table;
when the logical sector of the memory is indicated as being erased, or having an invalid mapping to a particular reserved location of the memory, generating a sector of data from a data pattern in the sector allocation table and outputting the generated sector of data to the host;
wherein the generated sector of data is an original sector of data intended to be written to the logical sector of the memory during a write operation and the data pattern is a portion of the original sector of data, wherein the data pattern was recorded in the sector allocation table instead of writing the original sector of data in the logical sector of the memory during the write operation; and when the logical sector of the memory is indicated as having an invalid mapping to a reserved location of the memory different than the particular reserved location of the memory, returning an error status to the host.

9. The method of claim 7, wherein outputting the generated sector of data to the host comprises outputting the generated sector of data from a pattern output circuit that generates the generated sector of data from the data pattern.

10. The method of claim 9, wherein the pattern output circuit generates the generated sector of data from the data pattern by repeating the data pattern.

11. The method of claim 9, wherein the generated sector of data generated by the pattern output circuit from the data pattern comprises all 1s.

12. The method of claim 8, wherein determining whether the logical sector of the memory is indicated as having an invalid mapping to a reserved location of the memory comprises determining whether the logical sector of the memory is indicated as having a mapping to one of a plurality of special control blocks that can never map onto valid data sectors.

13. A method of operating a memory system, comprising:
receiving a read command from a host, wherein the read command is associated with a logical sector of a memory;
determining whether the logical sector of the memory is indicated as being erased, or having an invalid mapping to a reserved location of the memory, in a sector allocation table;
when the logical sector of the memory is indicated as being erased, or having an invalid mapping to a particular reserved location of the memory, programming a pattern output circuit with a data pattern from the sector allocation circuit, generating a sector of data from the data pattern using the pattern output circuit, and outputting the generated sector of data from the pattern output circuit to the host, wherein the generated sector of data is an original sector of data intended to be written to the logical sector of the memory in response to a write command and the data pattern is a portion of the original sector of data; and
when the logical sector of the memory is indicated as having an invalid mapping to another reserved location of the memory different than the particular reserved location of the memory, returning an error status to the host.

14. The method of claim 13, further comprising reading the data pattern from the sector allocation table.

15. The method of claim 14, wherein reading the data pattern from the sector allocation table comprises reading the data pattern from a memory sector offset component of the sector allocation table.

16. The method of claim 13, wherein outputting the generated sector of data from the pattern output circuit to the host comprises outputting the generated sector of data from the pattern output circuit to the host regardless of whether a physical sector of the memory corresponding to the logical sector of the memory is actually erased.

17. The method of claim 13, wherein the data pattern is a data pattern of all 1s.

18. The method of claim 13, wherein generating the sector of data from the data pattern using the pattern output circuit comprises repeating the data pattern.

19. The method of claim 13, wherein determining whether the logical sector of the memory is indicated as having an invalid mapping to a reserved location of the memory comprises determining whether the logical sector of the memory is indicated as having a mapping to one of a plurality of special control blocks that are not permitted to map onto valid data sectors.

20. The method of claim 13, wherein determining whether the logical sector of the memory is indicated as being erased comprises determining whether the logical sector of the memory is indicated as having an invalid mapping to the particular reserved location of the memory and determining that a memory sector offset component of the sector allocation table contains all 1s.

* * * * *